(12) United States Patent
Bendel

(10) Patent No.: US 9,897,068 B2
(45) Date of Patent: Feb. 20, 2018

(54) METHOD FOR MOUNTING A ROTOR BLADE AND ASSEMBLY ARRANGEMENT

(71) Applicant: REPOWER SYSTEMS SE, Hamburg (DE)

(72) Inventor: Urs Bendel, Fockbek (DE)

(73) Assignee: Senvion SE, Hamburg (DE)

( * ) Notice: Subject to any disclaimer, the term of this patent is extended or adjusted under 35 U.S.C. 154(b) by 241 days.

(21) Appl. No.: 14/433,362

(22) PCT Filed: Sep. 19, 2013

(86) PCT No.: PCT/EP2013/069474
§ 371 (c)(1),
(2) Date: Apr. 2, 2015

(87) PCT Pub. No.: WO2014/053329
PCT Pub. Date: Apr. 10, 2014

(65) Prior Publication Data
US 2015/0260156 A1    Sep. 17, 2015

(30) Foreign Application Priority Data

Oct. 2, 2012   (DE) .......................... 10 2012 109 403

(51) Int. Cl.
*F03D 13/10*    (2016.01)
*F03D 1/06*    (2006.01)
*B23P 15/02*    (2006.01)

(52) U.S. Cl.
CPC ............ *F03D 1/0633* (2013.01); *B23P 15/02* (2013.01); *F03D 13/10* (2016.05);
(Continued)

(58) Field of Classification Search
CPC ........ F03D 1/0633; F03D 13/10; F03D 13/40; B23P 15/02; F05B 2270/331
See application file for complete search history.

(56) References Cited

U.S. PATENT DOCUMENTS

2007/0025840 A1* 2/2007 Weaver ................... F03D 13/10
   415/122.1
2007/0258823 A1* 11/2007 Haarh ..................... B66C 1/108
   416/223 R
(Continued)

FOREIGN PATENT DOCUMENTS

EP   2 345 811   7/2011
WO   03/100249   12/2003

*Primary Examiner* — Dwayne White
*Assistant Examiner* — Aaron R Eastman
(74) *Attorney, Agent, or Firm* — Bay State IP, LLC

(57) ABSTRACT

The invention relates to a method for mounting a rotor blade with a rotor blade shell and an internal space defined by the rotor blade shell, by at least one rotor blade clamp being applied around the outside of the rotor blade shell, by means of which at least one clamping force is exerted from the outside to the rotor blade shell, directed into the internal space by at least one expansion device being introduced into the internal space, by the expansion device inside the internal space being moved into at least one segment of the rotor blade around which the at least one rotor blade clamp is applied, by the at least one expansion device being expanded inside the at least one segment until at least one outwardly-acting counteracting force is exerted from the inside on the rotor blade shell.

6 Claims, 3 Drawing Sheets

(52) U.S. Cl.
CPC ....... *F05B 2270/331* (2013.01); *Y02E 10/721* (2013.01); *Y10T 29/49316* (2015.01); *Y10T 29/53039* (2015.01)

(56) References Cited

U.S. PATENT DOCUMENTS

| | | | | |
|---|---|---|---|---|
| 2008/0216301 A1* | 9/2008 | Hansen | ................... | B66C 1/108 29/428 |
| 2009/0025219 A1* | 1/2009 | Hansen | ................... | B66C 1/108 29/889 |
| 2010/0135790 A1* | 6/2010 | Pal | ....................... | F03D 1/0675 416/1 |
| 2010/0135796 A1* | 6/2010 | Kavala | .................. | F03D 1/0675 416/1 |
| 2011/0185571 A1* | 8/2011 | Maj | ........................ | B66C 1/108 29/889 |
| 2012/0032125 A1* | 2/2012 | Diaz De Corcuera | . | B66C 1/108 254/131 |
| 2012/0076663 A1* | 3/2012 | From | ..................... | F03D 1/001 416/244 R |
| 2012/0098283 A1* | 4/2012 | Maj | ........................ | B66C 1/108 294/67.1 |
| 2012/0161446 A1* | 6/2012 | McNeill | ................ | F03D 1/0675 290/55 |

* cited by examiner

METHOD FOR MOUNTING A ROTOR BLADE AND ASSEMBLY ARRANGEMENT

CROSS REFERENCE TO RELATED APPLICATION

This application is for entry into the U.S. National Phase under § 371 for International Application No. PCT/EP2013/069474 having an international filing date of Sep. 19, 2013, and from which priority is claimed under all applicable sections of Title 35 of the United States Code including, but not limited to, Sections 120, 363, and 365(c), and which in turn claims priority under 35 USC 119 to German Patent Application No. 10 2012 109 403.9 filed on Oct. 2, 2012.

BACKGROUND OF THE INVENTION

Field of the Invention

The invention relates to a method for mounting a rotor blade, and to a rotor blade for a wind turbine, and to a mounting arrangement for the rotor blade for carrying out the method, and to an expansion device.

Description of the Related Art

Methods for mounting rotor blades, rotor blades suited therefor, and mounting arrangements for rotor blades are known from the prior art.

A method for mounting and dismantling a rotor blade is known from DE 10 2006 008 428 A1. Here a sleeve is placed over the rotor blade root and pulled tight. The sleeve is provided with hooking devices for hoisting ropes and enables the force acting on the rotor blade shell to be distributed evenly. Damage to the rotor blade casing during mounting is thereby counteracted.

A method for mounting a rotor blade for a wind turbine is known from DE 10 2009 024 324 A1, in which webs are bonded to a plastic half-shell, wherein the webs are held in position by means of a web-holding device in order to harden the adhesive.

A method for mounting and dismantling a rotor blade is moreover disclosed in DE 10 2006 008 428 A1, in which a sleeve is arranged directly next to a projection on the rotor blade root, and hoisting means are fastened to the sleeve.

Furthermore, rotor blade clamps are known which can be firmly clamped around the outside of the rotor blade in the region remote from the rotor blade root, in the vicinity of the tip of the rotor blade, in order to fasten further retaining ropes to them. The rotor blade lying horizontally on the ground can be hoisted up vertically from the earth, with the aid of the rotor blade clamps, and can be brought level with the blade connection on the nacelle with its horizontal position maintained.

Rotor blades are constructed from multi-layer laminates which have an internal structure in the form of opposing chords running longitudinally on two rotor blade half-shells bonded to each other, and webs arranged between them. The surfaces of the laminates are sensitive to pressure and the application of force. Furthermore, damage can be caused not only to the outer shell of the rotor blade but also to the internal structure of the rotor blades by the rotor blade clamps and by the punctual forces caused by retaining ropes placed around the outer shell of the rotor blade.

SUMMARY OF THE INVENTION

The object of the present invention is therefore to provide a method and a mounting arrangement which enable a gentle fastening of the rotor blade to the nacelle and provide a rotor blade suited therefor, and an expansion device.

In its first aspect, the invention is achieved by a method having the features of claim 1.

The method according to the invention exploits the idea of applying at least one rotor blade clamp, to which retaining ropes can be fastened and by means of which the rotor blade can be hoisted up, around the outside of the rotor blade shell. However, by virtue of the at least one rotor blade clamp, at least one clamping force is disadvantageously exerted from the outside on the rotor blade shell, directed into an internal space of the rotor blade shell. The at least one clamping force can result in damage to an internal structure of the rotor blade and/or the rotor blade shell.

According to the invention, at least one expansion device is introduced into the internal space of the rotor blade before, after or at the same time as the at least one rotor blade clamp is applied and clamped firmly. The at least one expansion device is moved in each case inside the internal space into that segment of the rotor blade associated with it around which the associated rotor blade clamp is applied from the outside. Inside the internal space of the at least one segment around which the at least one rotor blade clamp is applied, the at least one associated expansion device is expanded. This can preferably happen at the same time as the at least one rotor blade clamp is clamped firmly. The at least one expansion device exerts from the inside at least one outwardly-acting counteracting force on the rotor blade shell, which at least partially compensates the at least one clamping force.

The at least one counteracting force is preferably increased or reduced by the same amount as the clamping force associated in each case so that the lowest possible total force is always exerted whilst the at least one blade clamp is being clamped firmly and the at least one expansion device is being expanded. The clamping force and expansion force can also be increased in such a way that the total force does not exceed predetermined maximum values.

The total force which acts on the in particular internal structure of the rotor blade, in particular on the chords and webs, is advantageously thus reduced and damage to the internal structure of the rotor blade and the external shell of the rotor blade avoided.

In order to determine the total force exerted, the load on the rotor blade shell and/or the internal structure of the rotor blade, in particular the bonding points of the webs, in particular where the main webs are bonded to the chords, and the webs themselves, is preferably measured.

Deformation advantageously of the internal structure in the at least one segment around which the at least one rotor blade clamp is applied, is preferably measured. The deformation and the load can be measured by means of strain gauges which are integrated, for example, into the laminates of the rotor blade shell, into the webs and/or the bonds. The strain gauges can be enclosed in the laminate of the mentioned components of the rotor blade but also in other components.

The load is measured and the measurement values supplied to a controller unit. The measurement values are evaluated and control values are determined which are supplied to a control unit of the at least one expansion device, which control unit adjusts the at least one expansion device in such a way that the measured deformation is reduced or minimized or that maximum values are not exceeded.

In an embodiment of the invention which can be produced inexpensively, the design of the control device is preferably electronic.

In a further preferred embodiment of the method according to the invention, the rotor blade, with at least one expansion device introduced into the internal space of the rotor blade and adjusted therein, is pulled up to the nacelle of a wind turbine. The rotor blade is mounted there and the at least one rotor blade clamp and the at least one expansion device are then released in pairs. The at least one rotor blade clamp and the at least one expansion device can then be used to mount a further rotor blade on the same or a different wind turbine. The same also applies correspondingly for dismantling the rotor blade or blades.

The at least one rotor blade clamp and the expansion device associated with it in each case are advantageously clamped firmly and expanded at the same time during erection and are released and contracted at the same time during disassembly. As a result, also no peak loads occur on the rotor blade during the firm clamping or releasing.

The expansion device can preferably have at least its own motor drive by means of which the expansion device can preferably be displaced back and forth between two webs or along a web in the longitudinal direction of the rotor blade. In addition, the expansion device can be expanded and folded up using an expansion drive. The motor drive and the expansion drive can also at least partially coincide.

It is, however, also conceivable, in another embodiment of the invention, to secure the at least one expansion device to a rope so that the at least one expansion device, after the rotor blade has been mounted and the expansion device has been released again, can be pulled out of the rotor blade tip by hand.

The rotor blade has an internal space defined by the rotor blade shell, and at least one segment around which the at least one rotor blade clamp can be applied from the outside. The internal space has dimensions such that at least one expansion device can be displaced back and forth inside the internal space.

According to the invention, measurement sensors are arranged on the rotor blade, preferably integrated into the rotor blade, which measure a load on the rotor blade shell during mounting/dismantling. The measurement sensors are preferably arranged in the at least one segment around which the at least one rotor blade clamp can be arranged from the outside.

The measurement sensors can have strain gauges and be designed as strain gauges. They can, however, also be designed as optical sensors which are configured in such a way that, when rotor blade half-shells which have fiberglass grids are present, and a laser is directed at the fibers, the sensors measure laser light emerging from the fibers and can draw conclusions about the load on the fiberglass grid from deviations in the angle of reflection.

The measurement sensors are connected, preferably via data links, to at least one connection, likewise preferably integrated into the rotor blade shell, preferably at the rotor blade connection. The at least one connection is intended for a controller unit. The controller unit can be plugged, in the region of the blade root, into the connections which are electronically connected to the sensors, wherein the controller unit has a further connection as an output for control values which are determined for the expansion device. However, the controller unit can also be a component of the rotor blade and be permanently arranged on it.

It is, however, also conceivable to provide the measurement sensors with radio transmitters for the measurement values. The controller unit has complementary receivers. In this embodiment of the invention, cables integrated into the rotor blade shell or enclosed in its laminate can be dispensed with.

The controller unit determines, from the measurement values provided by the measurement sensors, loads on the rotor blade, in particular on the rotor blade half-shell and the webs in the region of the rotor blade clamp, and calculates, from the measurement values of the at least one expansion device, suppliable control values which adjust the at least one expansion device.

The mounting arrangement in particular has one of the abovedescribed rotor blades, a hoisting device with at least one rotor blade clamp by means of which at least one clamping force can be exerted on the rotor blade shell from the outside, directed into its internal space, and at least one expansion device, which can be introduced into the internal space preferably via the rotor blade root and can be moved into the at least one segment and can be expanded inside the segment around which the at least one rotor blade clamp is placed until it exerts on the rotor blade shell at least one counteracting force, which acts from the inside to the outside, counteracting at least one clamping force, and hence reduces a total force which causes deformation of the rotor blade shell.

The expansion device is suited for carrying out one of the abovementioned methods and can be a component of a described mounting arrangement.

The expansion device according to the invention has opposite pressure pads by means of which a counteracting force can be exerted on internal walls of a rotor blade shell, in particular in order to at least partially compensate the clamping force of a rotor blade clamp, acting from the outside on the rotor blade shell and the internal structure. It comprises a motor drive by means of which the expansion device can be displaced along an internal space of the rotor blade, and an expansion drive by means of which the pressure pads can be moved apart from and toward each other. The pressure pads are intended to bear against internal walls of the rotor blade shell, in particular of both opposite main chords.

In an embodiment which can be produced simply, the expansion device has a spreading rod on which the two pressure pads are arranged.

The invention is described with the aid of an exemplary embodiment in six drawings, in which:

DETAILED DESCRIPTION OF THE PREFERRED EMBODIMENTS

Figure 1:
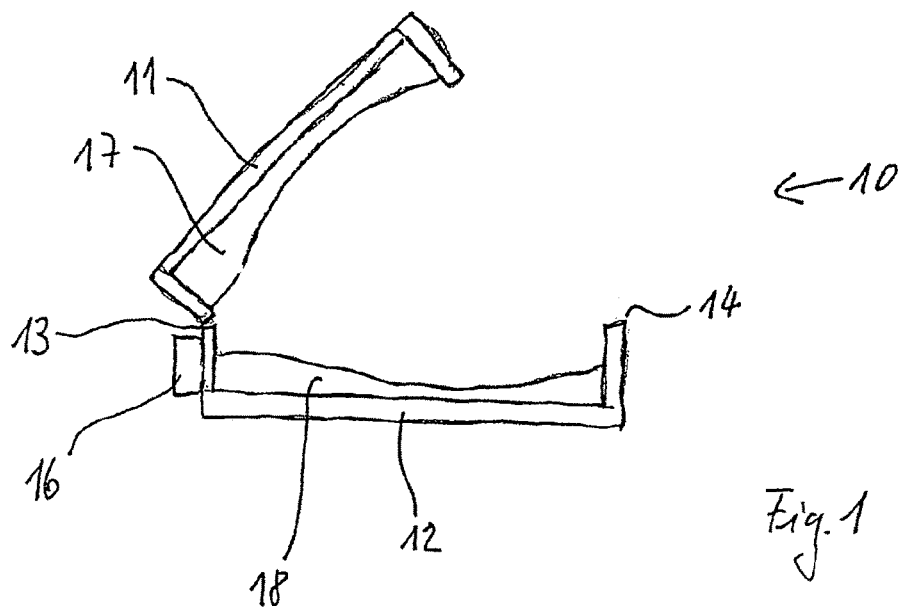
FIG. 1 shows a front view of an open rotor blade clamp.

FIG. 1 shows a rotor blade clamp 10. It has an upper pivotable sky-side clamping arm 11 and a lower ground-side clamping arm 12. The upper clamping arm 11 is arranged on the ground-side clamping arm 12 so that it can be pivoted as desired at a first hinge 13 or a second opposite hinge 14 to open and close the rotor blade clamp 10. The rotor blade clamp 10 has a locking mechanism 16 by means of which the sky-side and the ground-side clamping arms 11, 12 can be locked in a fixed position relative to each other.

The inner sides of the sky-side and the ground-side clamping arms 11, 12 are each provided with a sky-side and a ground-side impact protection guard 17, 18, respectively, which counteract damage to an outer surface of a rotor blade 20 gripped inside the rotor blade clamp 10.

Figure 2:
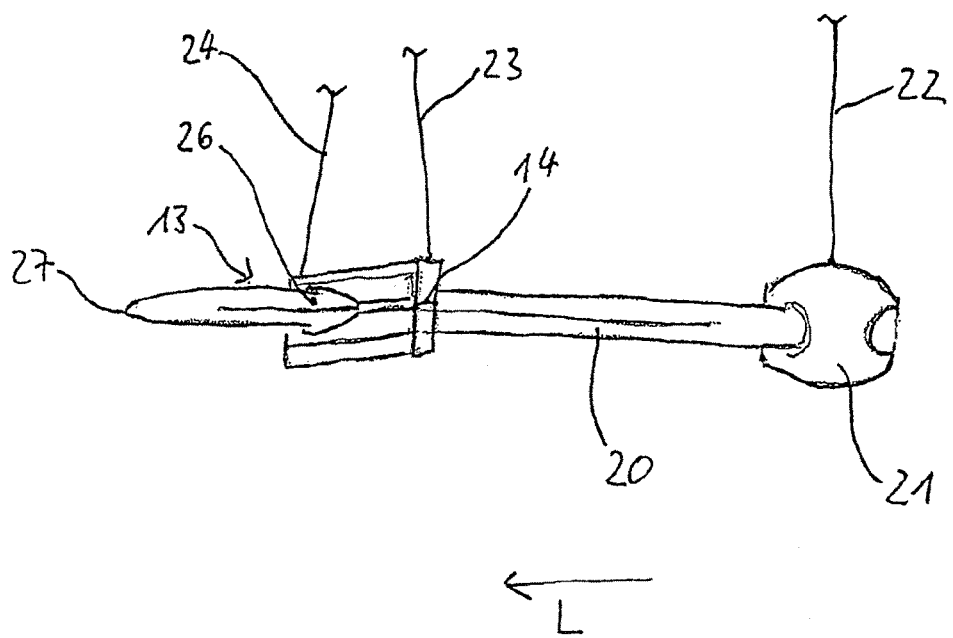
FIG. 2 shows a rotor blade with a mounted rotor hub and a rotor blade clamp according to FIG. 1 applied to the rotor blade.

FIG. 2 shows a rotor blade 20, ready for mounting, with a rotor hub 21 and a closed rotor blade clamp 10 according to FIG. 1.

During the mounting of a rotor on a wind turbine, a first rotor blade 20 is first mounted on the rotor hub 21. The rotor blade 20 is attached to the rotor hub 21 in a horizontal position directly next to the already erected tower (not shown) of the wind turbine with a nacelle rotatably mounted on the tower.

The rotor blade clamp 10 can, according to FIG. 1, be folded open by means of the first and second hinges 13, 14 on both sides transverse to a longitudinal direction L of the clamped rotor blade 20. The opened rotor blade clamp 10 is arranged on a vertically extendable support device, the Merlot®, and, in the open state, is moved on the ground onto the rotor blade 20 until the rotor blade 20 bears with its ground-side outer wall against the ground-side impact protection guard 18 of the ground-side clamping arm 12 of the rotor blade clamp 10. The rotor blade clamp 10 is then closed by the sky-side clamping arm 11 being pivoted and locked over a segment 26 of the rotor blade 20, bearing against the rotor blade clamp 10. The rotor blade clamp 10 is thus firmly clamped to the rotor blade 20 by tensioning the locking mechanism 16. A sufficiently great clamping force must thus be exerted on the outer wall of the rotor blade 20 to make it difficult for the rotor blade 20 to slip out of the rotor blade clamp 10, and preferably prevent it, during the mounting or dismantling process.

Alternatively, the already closed rotor blade clamp 10 can be threaded over a tip 27 of the rotor blade 20 and then be pushed in the longitudinal direction L in the closed state over the rotor blade 20 until it has been pushed into the segment 26 of the rotor blade 20 which is provided for the application of the rotor blade clamp 10.

Three hoisting ropes 22, 23, 24 are provided for hoisting up the rotor blade 20. In other embodiments of the invention, it is of course also conceivable to use a different number of hoisting ropes 22, 23, 24. The first hoisting rope 22 is fastened directly to the rotor hub 21. The second and the third hoisting ropes 23, 24 are fastened opposite each other to the rotor blade clamp 10 next to the first and second hinges 13, 14.

The rotor hub 21 and the single rotor blade 20 are hoisted up, by means of a crane (not shown) having a crane arm, from the horizontal position next to the tower by the three hoisting ropes 22, 23, 24 vertically from the ground, preferably from the earth, and hoisted up from there to the nacelle. During the hoisting procedure, the rotor blade 20 according to FIG. 2 remains constantly in an essentially horizontal position.

When tensioned, the rotor blade clamp 10 exerts a clamping force which acts from the outside into an internal space 53 formed between the two rotor blade shells. The clamping force can result in damage to the relatively light and delicate, in particular internal structure of the rotor blade 20, in particular to the main webs 51, 52 which run parallel to each other inside the internal space 53 of the rotor blade 20 in the longitudinal direction L from a rotor blade root 28 to the tip 27 of the rotor blade 20. The clamping force can, however, also or additionally cause other damage, for example to the outer skin. The damage can go undiscovered as inter-fiber fractures in the laminate or as cracks in the bonds of the main webs 51, 52 to a sky-side main chord 54 and a ground-side main chord 55 of the two rotor blade half-shells of the rotor blade 20.

A spreading device 30 according to FIGS. 3, 4, 5, 6 is provided to prevent damage to the internal structure of the rotor blade 20. The spreading device 30 shown in FIGS. 3, 4, 5, 6 is shown only by way of example. A wide variety of embodiments of the spreading device are conceivable.

Figure 3:
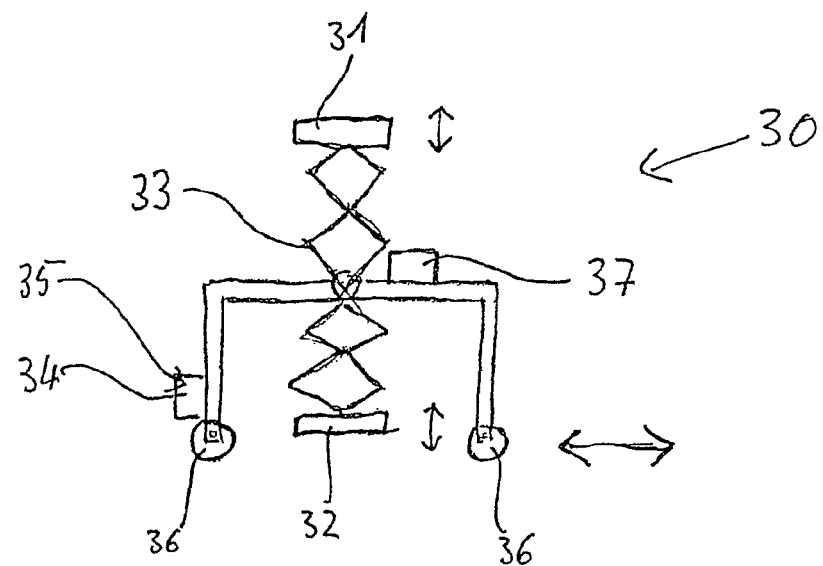
FIG. 3 shows a side view of a spreading device according to the invention.

FIG. 3 shows the spreading device 30 with a frame, having four wheels 36, with a motor drive 34 by means of which the spreading device 30 can be moved through between the two main webs 51, 52, horizontally in the longitudinal direction L of the rotor blade 20. To do this, the width of the spreading device 30 perpendicular to the direction of travel is such that it passes between the two main webs 51, 52. It can be displaced back and forth in the longitudinal direction L. The motor drive 34 enables the spreading device 30 to travel in a folded-together state in the longitudinal direction L between the two main webs 51, 52 from the rotor blade root 28 into the tip 27 of the rotor blade 20. The motor drive 34 comprises an electromotor 35 with wheels 36 driven by it. The spreading device 30 travels back and forth in the longitudinal direction L on the inner wall of the ground-side main chord 55 of the rotor blade 20. The spreading device 30 according to FIG. 3 has two opposite pressure pads 31, 32. The two pressure pads 31, 32 can be moved toward and apart from each other by means of a spreadable and refoldable spreading rod 33. The spreading device 30 has a spreading drive 37 for spreading and folding up the spreading rod 33. The spreading drive 37 can also be driven via the electromotor 35.

Figure 4:
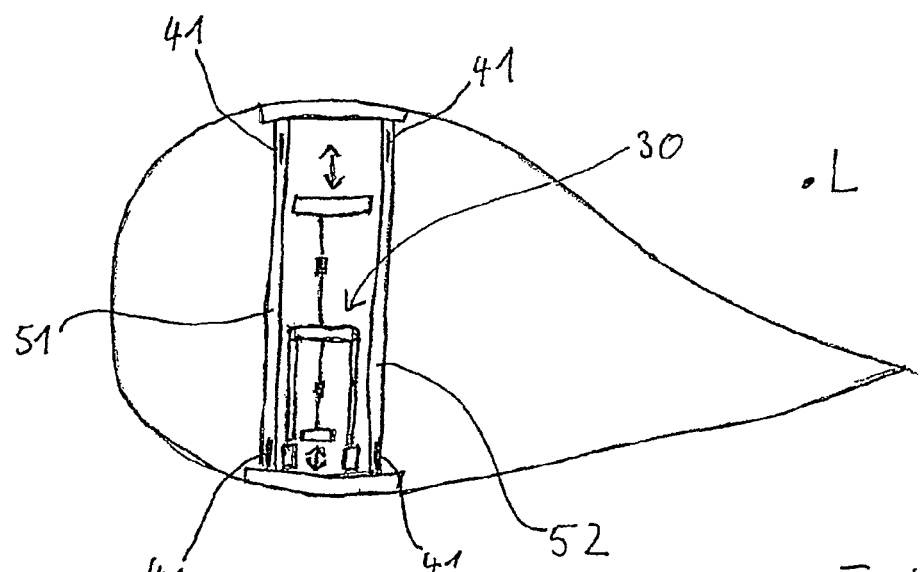
FIG. 4 shows a side view, in partial section, of the contracted spreading device according to FIG. 3, between the main webs of the rotor blade.
Figure 5:
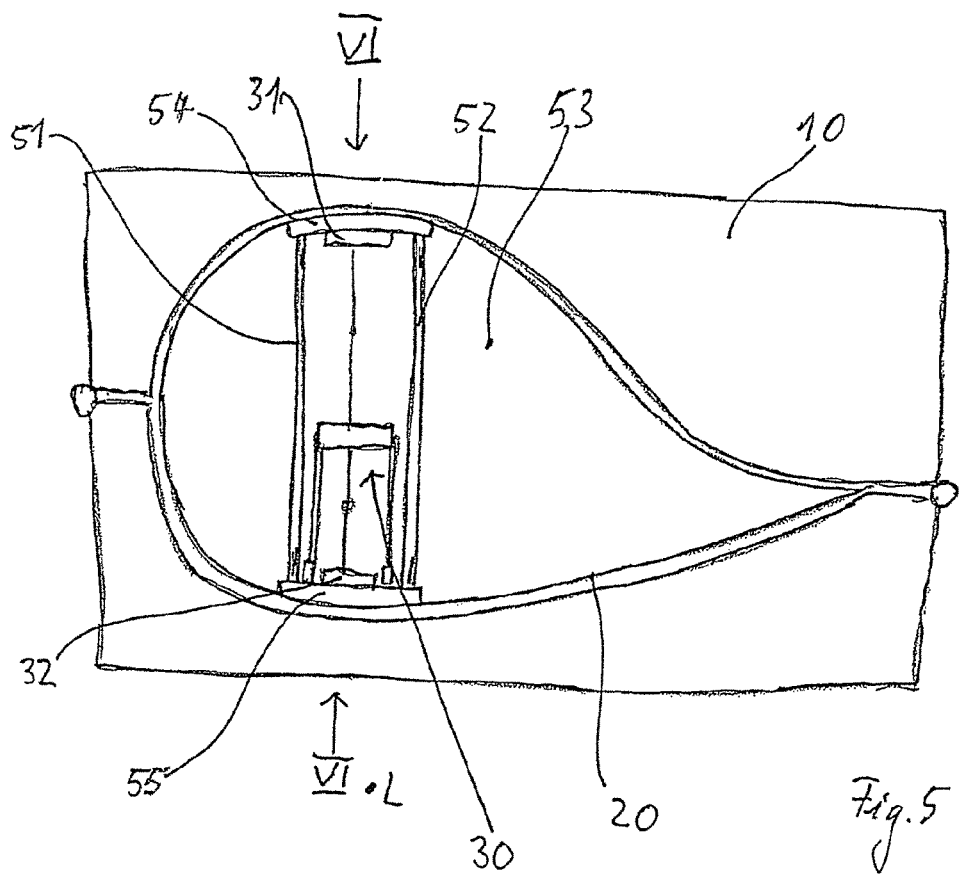
FIG. 5 shows the spread spreading device according to FIG. 3 inside a segment of the rotor blade clamp clamped around the rotor blade.

The spreading device 30 is introduced in FIG. 2 into the internal space 53 of the rotor blade 20 between the two main webs 51, 52 via the mounted rotor hub 21 and the rotor blade root 28 which is open facing the rotor hub 21, and, with the rotor blade 20 in a horizontal position, displaced there by the motor drive 34 into the segment 26 toward the tip 27 of the rotor blade 20 according to FIG. 4, in which the rotor blade clamp 10 is clamped around the outside of the rotor blade 20. Inside the segment 26 in which the rotor blade clamp 10 is clamped around the outside of the rotor blade 20, the spreading device 30 according to FIG. 5 is spread by means of the spreading drive 37 until it presses from the inside with the two pressure pads 31, 32 against the inner walls of the main chords 54, 55 and thus counteracts the clamping force, acting from the outside, of the rotor blade clamp 10 with a counteracting force.

A controller unit 40 is provided to control the counteracting force and the correctly proportioned size of the counteracting force. The controller unit 40 is positioned outside the rotor blade 20 during its operation.

Figure 6:
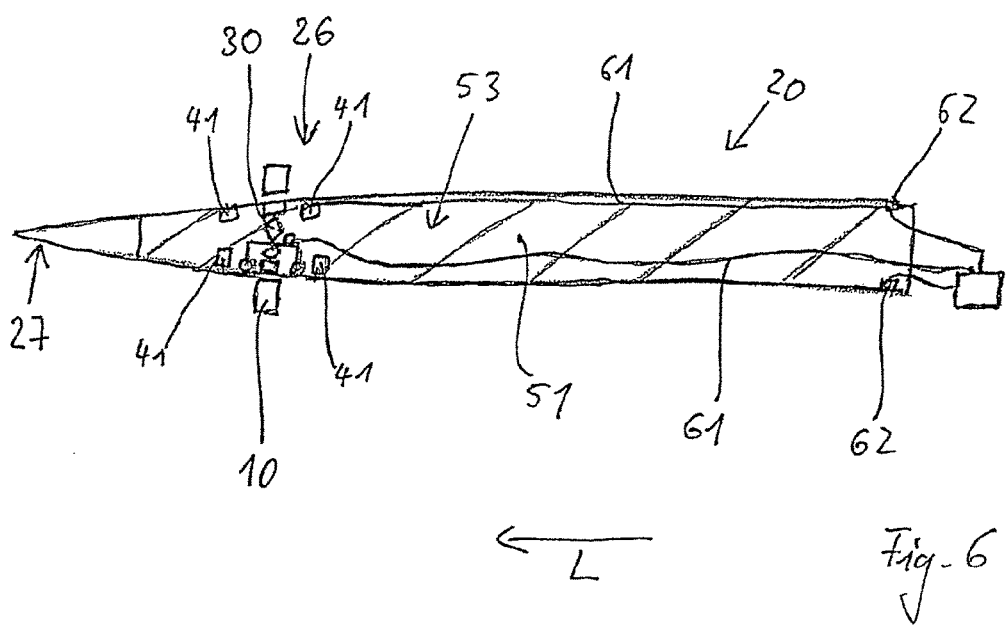
FIG. 6 shows a view in section of the arrangement in FIG. 5 along the line VI-VI.

FIG. 6 shows the wiring of the controller unit 40 in a longitudinal section along the rotor blade 20. The controller unit 40 is, on the one hand, connected in a data-transferring manner to the motor drive 34 and to the spreading drive 37 of the spreading device 30 and, on the other hand, connected in a data-transferring manner to sensors integrated in the rotor blade 20, such as strain gauges 41 or the like.

The strain gauges 41 are provided in the region of or in the bonds of the main webs 51, 52 on the two opposite main chords 54, 55. They can also be integrated into the laminate of the main webs 51, 52 or of the rotor blade half-shells. Each of the strain gauges 41 is connected to a respective electrical contact 62 arranged on the rotor blade root 28 by a respective electrical cable 61. The strain gauges 41 determine the forces acting on the main webs 51, 52 and the bonds via deformation of the main webs 51, 52 caused by the clamping force, acting from the outside, of the rotor blade clamp 10. The controller unit 40 calculates, from the measurement values of the strain gauges 41, the counteracting force with which the spreading device 30 needs to be pressed from the internal space 53 against the two opposite inner walls of the main chords 54, 55, so that its total force resulting from the addition of the counteracting force and the clamping force is as low as possible and/or the deformations measured by the strain gauges 41 are minimized. The controller unit 40 is designed as a control loop so that, when the measured load which is exerted by the main webs 51, 52 and the bonds of the main webs 51, 52 on the main chords 54, 55 becomes greater, the counteracting force is increased until the loads measured at the strain gauges 41 are minimized and then the spreading device 30 is adjusted.

Once the adjustment of the spreading device 30 is complete, the rotor blade 20 is hoisted up. The rotor blade 20, together with the rotor blade clamp 10 and the spread spreading device 30 according to FIG. 5, is hoisted up vertically from the horizontal position on the ground to the level of the nacelle, and at the level of the nacelle the rotor blade hub 21 according to FIG. 2 is rotated by 90° and mounted on the nacelle.

After the rotor blade hub 21 has been mounted on the nacelle, the clamping force of the rotor blade clamp 10 and the counteracting force of the spreading device 30 are reduced simultaneously, and the released rotor blade clamp 10 can be pulled off over the tip 27 of the rotor blade 20. The blade clamp 10 can also be completely opened and thus released from the rotor blade 20 and lowered again. At the same time, before or after, the released spreading device 30 is extracted from the rotor blade 20 arranged essentially horizontally at the level of the nacelle, between the main webs 51, 52 from the segment 26, by means of its own spreading drive 34.

The spreading device 30 is then used to mount a second rotor blade. The same applies to the rotor blade clamp 10. In order to mount the second rotor blade, the first rotor blade 20, together with the rotor hub 21, is first rotated by 120° so that the rotor blade connection of the second rotor blade of the already mounted rotor blade hub 21 is oriented in a horizontal position. The second rotor blade, lying horizontally on the ground, together with the rotor blade clamp 10, is oriented horizontally and hoisted up vertically, with the spreading device 30 inserted and adjusted, by means of the second and the third hoisting rope 23, 24 and by means of the first hoisting rope 22 fastened directly to the rotor blade root of the second rotor blade. It is hoisted up to the level of the rotor blade connection on the nacelle. The second rotor blade is then mounted on a second connection of the rotor hub 21, and the rotor blade clamp 10 and spreading device 30 are, as with the first rotor blade 20, in turn released.

The corresponding procedure is then repeated for a third rotor blade.

LIST OF REFERENCE NUMERALS 10 rotor blade clamp
11 sky-side clamping arm
12 ground-side clamping arm
13 first hinge
14 second hinge
16 locking mechanism
17 sky-side impact protection guard
18 ground-side impact protection guard
20 rotor blade
21 rotor hub
22 first hoisting rope
23 second hoisting rope
24 third hoisting rope
26 segment
27 tip
28 rotor blade root
30 spreading device
31 pressure pad
32 pressure pad
33 spreading rod
34 motor drive
35 electromotor
36 wheel
37 spreading drive
40 controller unit
41 strain gauges
51 main web
52 main web
53 internal space of the rotor blade
54 sky-side main chord
55 ground-side main chord
61 electrical cable
62 electrical contact
L longitudinal direction

The invention claimed is:

1. A method for mounting a rotor blade (20) with a rotor blade shell and an internal space (53) defined by the rotor blade shell, the mounting performed by at least one rotor blade clamp (10) being applied around the outside of the rotor blade shell, by means of which at least one clamping force is exerted from the outside on the rotor blade shell, directed into the internal space (53), by at least one expansion device (30) being introduced into the internal space (53), by the expansion device (30) inside the internal space (53) being moved into at least one segment (26) of the rotor blade (20) around which the at least one rotor blade clamp (10) is applied, by the at least one expansion device (30) being expanded inside the at least one segment (26) until at least one outwardly-acting counteracting force is exerted from the inside on the rotor blade shell, which at least partially compensates the at least one clamping force.

2. The method as claimed in claim 1, wherein a load is measured inside the at least one segment (26).

3. The method as claimed in claim 2, wherein a deformation is measured inside the at least one segment (26).

4. The method as claimed in claim 1, wherein the measurement values are supplied to a controller unit (40) and are evaluated there and control values are determined and supplied to the at least one expansion device (30), and the at least one expansion device (30) is expanded.

5. The method as claimed in claim 1, wherein the rotor blade (20), together with the at least one expanded expansion device (30), is pulled up to the nacelle of a wind turbine, and mounted there, and the at least one rotor blade clamp (10) and the at least one expansion device (30) are then released.

6. The method as claimed in claim 5, wherein the at least one expansion device (30) is secured to a rope, after mounting the rotor blade (20) is lowered with a tip (27), and the at least one expansion device (30) is pulled out of the internal space (53) on the rope after release of the expansion device.

\* \* \* \* \*